US011836960B2

(12) United States Patent
Sato

(10) Patent No.: US 11,836,960 B2
(45) Date of Patent: Dec. 5, 2023

(54) OBJECT DETECTION DEVICE, OBJECT DETECTION METHOD, AND PROGRAM

(71) Applicant: Konica Minolta, Inc., Tokyo (JP)

(72) Inventor: Fumiaki Sato, Takatsuki (JP)

(73) Assignee: Konica Minolta, Inc., Tokyo (JP)

( * ) Notice: Subject to any disclaimer, the term of this patent is extended or adjusted under 35 U.S.C. 154(b) by 27 days.

(21) Appl. No.: 17/621,469

(22) PCT Filed: May 22, 2020

(86) PCT No.: PCT/JP2020/020344
§ 371 (c)(1),
(2) Date: Dec. 21, 2021

(87) PCT Pub. No.: WO2021/005898
PCT Pub. Date: Jan. 14, 2021

(65) Prior Publication Data
US 2022/0351486 A1    Nov. 3, 2022

(30) Foreign Application Priority Data
Jul. 11, 2019    (JP) .................................. 2019-129183

(51) Int. Cl.
*G06V 10/00*    (2022.01)
*G06V 10/26*    (2022.01)
(Continued)

(52) U.S. Cl.
CPC .......... *G06V 10/273* (2022.01); *G06V 10/763* (2022.01); *G06V 10/7747* (2022.01); *G06V 10/82* (2022.01)

(58) Field of Classification Search
CPC .......... G06N 3/08; G06N 3/0454; G06N 3/02; G06N 20/00; G06V 10/273; G06V 10/255;
(Continued)

(56) References Cited

U.S. PATENT DOCUMENTS 8,098,891 B2 * 1/2012 Lv ........................... G06T 7/285
382/285
9,202,144 B2 * 12/2015 Wang .................... G06V 10/454
(Continued)

FOREIGN PATENT DOCUMENTS

JP    2019-61505 A    4/2019
WO    2019/013246 A1    1/2019

OTHER PUBLICATIONS

Bodla et al., "Soft-NMS-Improving Object Detection With One Line of Code", IEEE International Conference on Computer Vision (ICCV), Aug. 8, 2017, pp. 5561-5569, Cited in Specification.
(Continued)

*Primary Examiner* — Amir Alavi
(74) *Attorney, Agent, or Firm* — Rankin, Hill & Clark LLP

(57) ABSTRACT

An object detection device (1) includes an object detection unit (2) that detects an object from an image including the object by neural computation using a CNN. The object detection unit (2) includes: a feature amount extraction unit (2a) that extracts a feature amount of the object from the image; an information acquisition unit (2b) that obtains a plurality of object rectangles indicating candidates for the position of the object on the basis of the feature amount and obtains information and a certainty factor of a category of the object for each of the object rectangles; and an object tag calculation unit (2c) that calculates, for each of the object rectangles, an object tag indicating which object in the image the object rectangle is linked to, on the basis of the feature amount. The object detection device (2) further includes an excess rectangle suppression unit (4) that separates a plurality of object rectangles for which a category of the object is the same into a plurality of groups according to the object tags, and deletes an excess object rectangle in
(Continued)

each of the separated groups on the basis of the certainty factor.

16 Claims, 12 Drawing Sheets

(51) Int. Cl.
  *G06V 10/774* (2022.01)
  *G06V 10/762* (2022.01)
  *G06V 10/82* (2022.01)
(58) Field of Classification Search
  CPC .. G06V 10/82; G06V 10/7747; G06V 10/763; G06V 10/454; G06V 20/70; G06F 18/22; G06F 18/251
  See application file for complete search history.

(56) References Cited

U.S. PATENT DOCUMENTS

| | | | | |
|---|---|---|---|---|
| 9,881,234 | B2* | 1/2018 | Huang | G06F 18/2411 |
| 10,289,918 | B2* | 5/2019 | Yu | G06F 18/24133 |
| 10,387,740 | B2* | 8/2019 | Yang | G06N 3/045 |
| 10,452,959 | B1* | 10/2019 | Gautam | G06N 3/02 |
| 10,650,265 | B1* | 5/2020 | Price | G06F 18/217 |
| 11,055,574 | B2* | 7/2021 | Zhou | G06F 18/217 |
| 11,263,773 | B2* | 3/2022 | Kobayashi | G06V 20/10 |
| 11,527,072 | B2* | 12/2022 | Szoke-Sieswerda | G06V 10/764 |
| 2004/0091153 | A1* | 5/2004 | Nakano | G06V 40/10 382/190 |
| 2022/0129693 | A1* | 4/2022 | Pham | G06T 7/11 |

OTHER PUBLICATIONS

Hosang et al., "Learning non-manximum suppression", IEEE Conference on Computer Vision and Pattern Recognition (CVPR), May 9, 2017, pp. 4507-4515, Cited in Specification.

International Search Report (ISR) dated Aug. 11, 2020 filed in PCT/JP2020/020344.

PCT Written Opinion of the Internationla Searching Authority dated Aug. 11, 2020 filed in PCT/JP2020/020344.

* cited by examiner

GROUPING $D = (d1+d2+d3+d4)/4$ $D = IoU$

IoU: (area of overlap)/(area of union))

OBJECT DETECTION DEVICE, OBJECT DETECTION METHOD, AND PROGRAM

TECHNICAL FIELD

The present invention relates to an object detection device that detects an object from an image obtained by capturing the object, an object detection method, and a program.

BACKGROUND ART

In recent years, for security or marketing research, a technique for specifying a category (class) and a position of an object (for example, a person) in an image captured by a camera is required. Machine learning is widely used for robustly detecting an object, and many techniques particularly using a convolutional neural network (CNN) have been proposed in recent years.

Meanwhile, the object detection using CNN commonly uses non maximum suppression (NMS) processing. This NMS processing includes: when there are multiple rectangles (hereinafter also referred to as "object rectangles") indicating the candidates of the position of the object in the image, sorting (rearranging) the multiple object rectangles in descending order of certainty factors (hereinafter, also simply referred to as "certainty factors of objects") of the categories of the object surrounded by the object rectangles; setting, to zero, the certainty factor of the object surrounded by the object rectangle which is the same in category as the object rectangle having the highest certainty factor and which has a degree of overlap (intersection over union (IoU)) equal to or greater than a threshold with respect to the object rectangle having the highest certainty factor; and deleting this object rectangle to thereby leave the object rectangle having the highest certainty factor.

However, in the conventional NMS processing, when the objects to be detected in the image are close to each other, the certainty factor of the object, which is intended to be originally left, may become zero, and the rectangle of the object may be deleted. For example, as illustrated in FIG. 15, it is assumed that the CNN detects that categories of objects 1001 and 1002 surrounded by object rectangles 1001*a* and 1002*a* in an image are the same (for example, person), and their certainty factors are 0.8 and 0.9, respectively. When the conventional NMS processing is performed on such object rectangles 1001*a* and 1002*a*, the certainty factor of the object 1001 having a certainty factor of 0.8 which is relatively low becomes zero with respect to the object rectangle 1002*a* of the object 1002 having a certainty factor of 0.9 which is relatively high, because a degree of overlap between the object rectangle 1001*a* and the object rectangle 1002*a* is large (because the IoU is equal to or greater than a threshold). Thus, the object rectangle 1001*a* of the object 1001 which is intended to be originally left is deleted. That is, in this case, although the object 1001 has been detected by the CNN, the object 1001 cannot be detected by performing the NMS processing.

In view of this, for example, in the technology (Soft-NMS processing) disclosed in Non Patent Literature 1, when objects 1001 and 1002 of the same category are close to each other in an image as illustrated in FIG. 16, the certainty factor of the category of the object 1001 is lowered (for example, from 0.8 to 0.4 in FIG. 16) according to the magnitude of IoU between the object rectangle 1001*a* and the object rectangle 1002*a*. This processing does not set the certainty factor to zero and leaves the object rectangle 1001*a*, enabling detection of the object 1001.

Furthermore, the technology disclosed in, for example, Non Patent Literature 2 updates the certainty factor itself by a deep neural network (DNN) without performing NMS processing, when object rectangles are narrowed down.

CITATION LIST

Non Patent Literature

Non Patent Literature 1: Navaneeth Bodla, et al., "Soft-NMS-Improving Object Detection With One Line of Code", 2017 IEEE International Conference on Computer Vision (ICCV), 8 Aug. 2017

Non Patent Literature 2: Jan Hosang, et al., "Learning non-maximum suppression", IEEE Conference on Computer Vision and Pattern Recognition (CVPR), 9 May 2017

SUMMARY OF INVENTION

Technical Problem

However, in the technique disclosed in Non Patent Literature 1, in a case where objects to be detected are close to each other and the certainty factors of the object rectangles are relatively low, the certainty factors of the object rectangles may decrease without limit by the Soft-NMS processing. For example, in a case where the certainty factors of the objects 1001 and 1002 are 0.3 and 0.9, respectively, the certainty factor of the object 1001 may decrease to 0.05 by the Soft-NMS processing, as illustrated in FIG. 17. This is almost equivalent to setting the certainty factor of the object 1001 to zero, and the object 1001 cannot be accurately detected.

In addition, with the processing of updating the certainty factor itself by DNN as described in Non Patent Literature 2, not all the certainty factors of the objects to be detected are increased, and it is naturally conceivable that the certainty factor is decreased. When the certainty factor decreases, an object cannot be accurately detected as in Non Patent Literature 1.

The present invention has been accomplished to solve the above problems, and an object of the present invention is to provide an object detection device, an object detection method, and a program with which it is possible to leave an object rectangle of an object to be detected without lowering a certainty factor, even in a case where objects to be detected in an image are close to each other, and thus to accurately detect each of the objects close to each other.

Solution to Problem

An object detection device according to one aspect of the present invention is an object detection device including an object detection unit that detects an object from an image including the object by neural computation using a convolutional neural network, wherein the object detection unit includes: a feature amount extraction unit that extracts a feature amount of the object from the image; an information acquisition unit that obtains a plurality of object rectangles indicating candidates for a position of the object on the basis of the feature amount and obtains information and a certainty factor of a category of the object for each of the object rectangles; and an object tag calculation unit that calculates, for each of the object rectangles, an object tag indicating which object in the image the object rectangle is linked to, on the basis of the feature amount, and the object detection device further includes an excess rectangle suppression unit that separates the plurality of object rectangles for which a category of the object is the same into a plurality of groups according to the object tags, and deletes an excess object rectangle in each of the separated groups on the basis of the certainty factor.

An object detection method according to another aspect of the present invention is an object detection method including an object detection step for detecting an object from an image including the object by neural computation using a convolutional neural network, wherein the object detection step includes: a feature amount extraction step for extracting a feature amount of the object from the image; an information acquisition step for obtaining a plurality of object rectangles indicating candidates for a position of the object on the basis of the feature amount and obtains information and a certainty factor of a category of the object for each of the object rectangles; and an object tag calculation step for calculating, for each of the object rectangles, an object tag indicating which object in the image the object rectangle is linked to, on the basis of the feature amount, and the object detection method further includes an excess rectangle suppression step for separating the plurality of the object rectangles for which a category of the object is the same into a plurality of groups according to the object tags, and deleting an excess object rectangle in each of the separated groups on the basis of the certainty factor.

A program according to still another aspect of the present invention is a program for causing a computer to execute the object detection method.

Advantageous Effects of Invention

The plurality of object rectangles for which the category of the object is the same are separated into a plurality of groups according to the object tags. For example, the plurality of object rectangles are separated into groups such that object rectangles with the same object tags belong to the same group, and object rectangles with different object tags belong to different groups. Then, processing of deleting an excess object rectangle (NMS processing) is performed for each group. The object rectangles belonging to each group are linked to the same object by the object tags. Therefore, even when objects to be detected in the image are close to each other, it is possible to leave only one object rectangle for each of the objects close to each other, and to leave information and certainty factor of the category of the object corresponding to the remaining object rectangle by performing the NMS processing for each group. That is, the object rectangle of the object to be detected can be left as it is without lowering the certainty factor. This enables accurate detection of the objects which are close to each other.

DESCRIPTION OF EMBODIMENTS

An embodiment of the present invention will be described below with reference to the drawings.

[1. Configuration of Object Detection Device]

Figure 1:
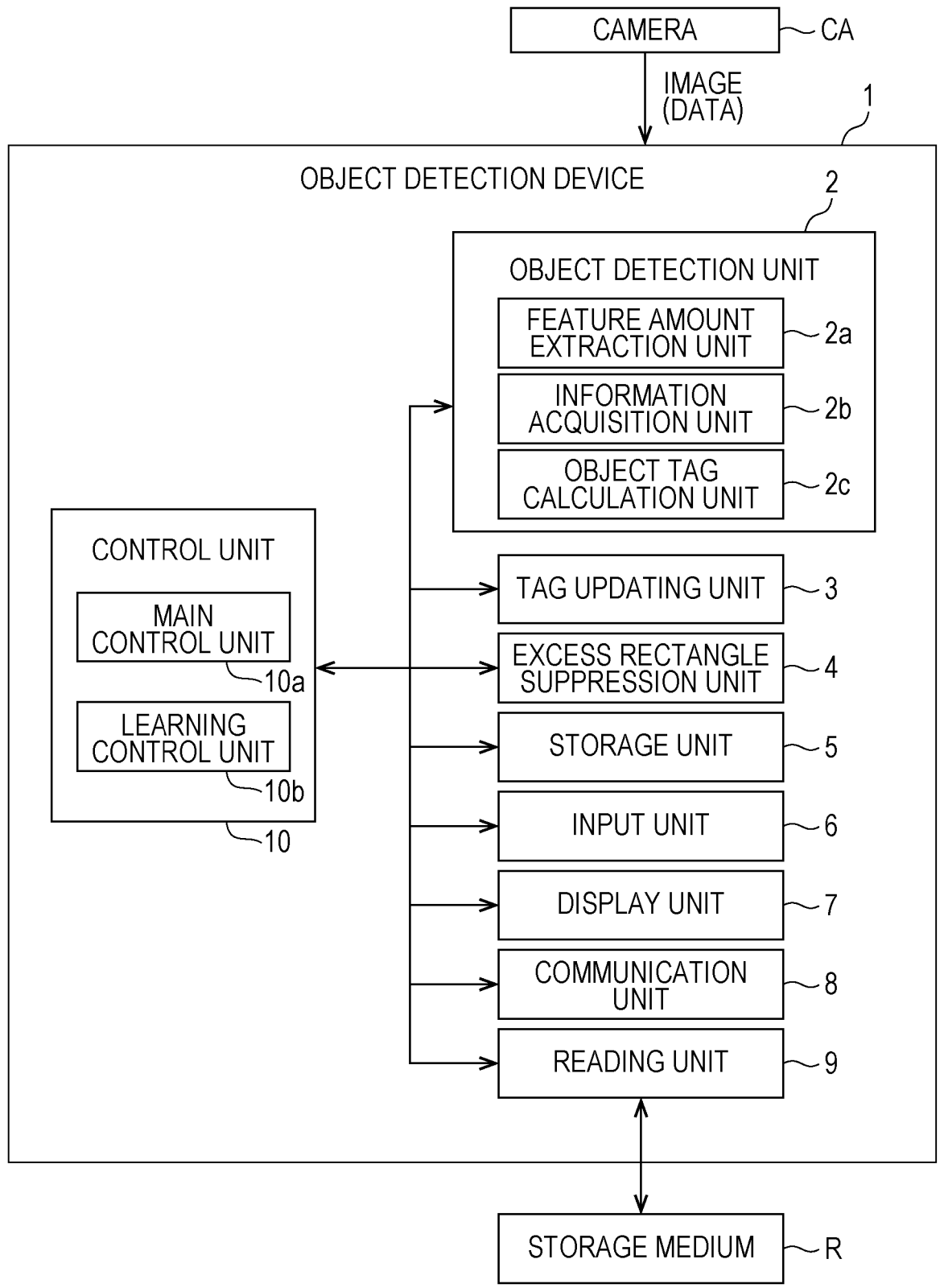
FIG. 1 is a block diagram illustrating a schematic configuration of an object detection device according to an embodiment of the present invention.

FIG. 1 is a block diagram illustrating a schematic configuration of an object detection device 1 according to the present embodiment. The object detection device 1 according to the present embodiment is implemented by, for example, a personal computer, and is connected to a camera CA via a communication line. The camera CA captures an object to acquire an image. Here, the image is a color image, and the image data of red (R), green (G), and blue (B) is, for example, 8-bit (0 to 255) data. The communication line is constructed by, for example, a wireless local area network (LAN), but may be constructed by a wired LAN or an Internet connection.

The object detection device 1 includes an object detection unit 2, a tag updating unit 3, an excess rectangle suppression unit 4, a storage unit 5, an input unit 6, a display unit 7, a communication unit 8, a reading unit 9, and a control unit 10.

The object detection unit 2 includes, for example, a graphics processing unit (GPU). The GPU is an arithmetic device (processor) specialized for real-time image processing. The GPU has a convolutional neural network (CNN) that detects an object from an image including the object by neural computation.

The object detection unit 2 includes a feature amount extraction unit 2a, an information acquisition unit 2b, and an object tag calculation unit 2c. The feature amount extraction unit 2a extracts a feature amount (joint points, shapes, colors, etc.) of an object from an input image. The information acquisition unit 2b obtains a plurality of object rectangles indicating candidates for the position of the object on the basis of the feature amount extracted by the feature amount extraction unit 2a, and obtains information (person, cat, dog, car, etc.) and a certainty factor (likelihood, score) of the category of the object for each object rectangle. Note that the certainty factor described above includes a certainty factor of the category, a certainty factor indicating the object likelihood of the object surrounded by the object rectangle, and a certainty factor as to whether or not the object is present there.

The object tag calculation unit 2c calculates, for each object rectangle, an object tag indicating which object in the image the object rectangle is linked to, on the basis of the feature amount extracted by the feature amount extraction unit 2a. The object tag is represented by, for example, a value of a tag such as "1", "2", or "3", and different tag values are assigned to the object rectangles for each individual object. Note that, depending on the degree of CNN learning, different tag values (for example, "1.2" and "1.5") may be assigned between object rectangles even for the same object.

Note that the extraction accuracy of the feature amount by the feature amount extraction unit 2a, the detection accuracy of the information and the certainty factor of the category by the information acquisition unit 2b, and the calculation accuracy of the object tag by the object tag calculation unit 2c can be increased by machine-training the object detection unit 2 in advance and updating a weight to be described later.

The tag updating unit 3 updates the tag value of the object tag calculated by the object tag calculation unit 2c. For example, the tag updating unit 3 updates tag values of the object tags so that the object tags have the same values for the same object and the object tags have different values for different objects. The tag value can be updated by, for example, grouping using a threshold or a clustering method, the details of which will be described later.

The excess rectangle suppression unit 4 separates a plurality of object rectangles for which the category of the object is the same into a plurality of groups according to the object tags, and performs NMS processing of deleting an excess object rectangle in each of the separated groups on the basis of the certainty factor. The detail of the NMS processing of the present embodiment will be described in conjunction with an object detection method to be described later.

The tag updating unit 3 and the excess rectangle suppression unit 4 described above may be implemented by, for example, a central processing unit (CPU).

The storage unit 5 is a memory that stores various types of information and an operation program of the control unit 10, and includes, for example, a hard disk, a random access memory (RAM), and a read only memory (ROM). The input unit 6 includes, for example, a keyboard, a mouse, a touch pad, a touch panel, and the like, and receives various commands input by a user. The display unit 7 includes, for example, a liquid crystal display device, and displays various types of information. For example, on the display unit 7, the object rectangle after the NMS processing is displayed for each object, and the information and the certainty factor of the category of the object are displayed (see FIG. 9).

The communication unit 8 is a communication interface for transmitting and receiving information to and from the outside, and includes an input/output port, a transmission circuit, a reception circuit, an antenna, a modulation circuit, a demodulation circuit, and the like. For example, data of an image acquired by the camera CA is taken into the object detection device 1 via the communication unit 8. The data of the image is temporarily stored in the storage unit 5 and transferred to the object detection unit 2.

The reading unit 9 is a device that reads information recorded on a recording medium R, and includes, for example, a disk drive. Note that, in a case where the recording medium R is a portable nonvolatile memory, a connection port into which a connection portion of the nonvolatile memory is inserted is also included in the reading unit 9. For example, an operation program of the object detection device 1 is recorded in the recording medium R, and the operation program is read by the reading unit 9. The read operation program is stored in the storage unit 5. Note that data of an image acquired by the camera CA may be recorded in the recording medium R.

The control unit 10 includes, for example, a CPU, and has a main control unit 10a and a learning control unit 10b. The main control unit 10a controls the operation of each unit of the object detection device 1 according to the operation program stored in the storage unit 5. Note that the main control unit 10a may also function as the tag updating unit 3 and the excess rectangle suppression unit 4 described above. The object detection unit 2 is machine-trained in advance by the learning control unit 10b.

[2. CNN Constituting Object Detection Unit]

Figure 2:
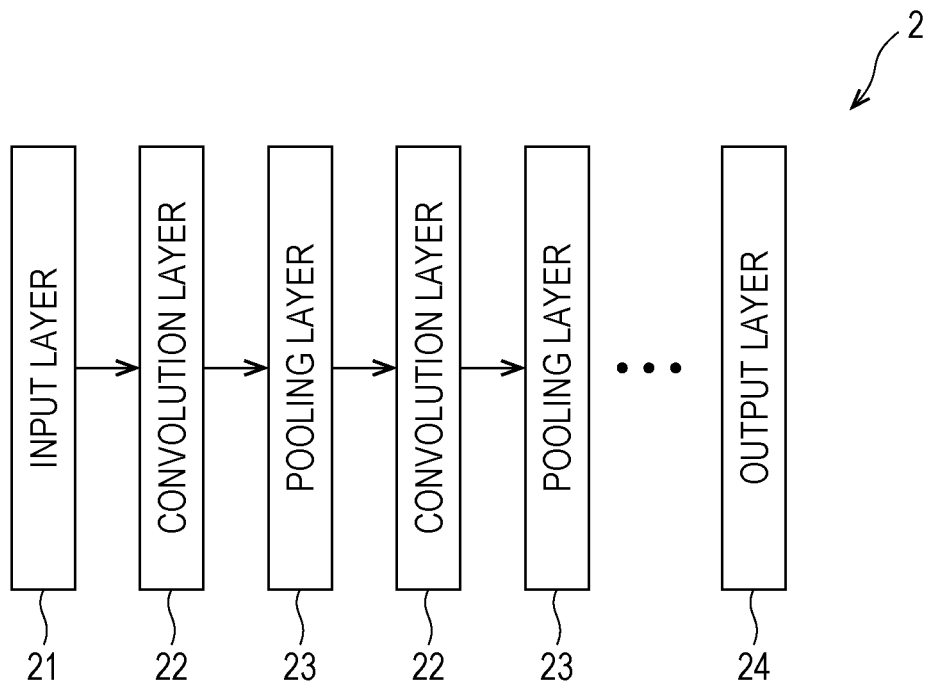
FIG. 2 is an explanatory diagram schematically illustrating a CNN that constitutes an object detection unit included in the object detection device.

FIG. 2 is an explanatory diagram schematically illustrating a CNN constituting the object detection unit 2. Further details about the CNN will be given below. The CNN includes an input layer 21, a convolution layer 22, a pooling layer 23, and an output layer 24. Note that at least one set of the convolution layer 22 and the pooling layer 23 may be provided.

Each layer (input layer 21, convolution layer 22, pooling layer 23, and output layer 24) constituting the CNN has a plurality of nodes (or units). A neural network is an information processing system that mimics a human neural network, and the above nodes represent models of engineering neurons corresponding to human neurons.

Figure 3:
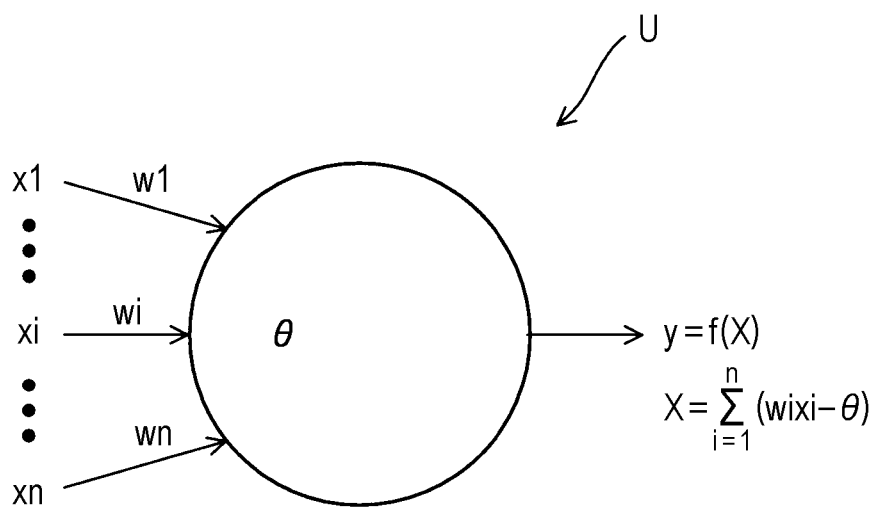
FIG. 3 is an explanatory diagram schematically illustrating a relationship between an input and an output with respect to one node in the CNN.

FIG. 3 schematically illustrates a relationship between an input and an output for one node U. As the node U, a multi-input single-output element is commonly used. A signal is transmitted only in one direction, is given a certain weight (connection weight: wi), and is input to the node U. This weight represents the strength of connection between the nodes U and U arranged hierarchically. The above weight can be changed by learning. From the node U, a value X obtained by subtracting a threshold $\theta$ from the sum of the weighted input values (wixi) is output by being transformed by a response function f (X). That is, an output value y of the node U is expressed by the following equation.

$$y = f(X)$$

where $X = \Sigma(w_i x_i - \theta)$ As the response function, a sigmoid function can be used, for example.

Data (pixel value) of each pixel of the input image is input to each node U of the input layer 21. The convolution layer 22 performs filter processing on a value output from a predetermined node U of the previous layer to thereby obtain a feature map (feature amount). The pooling layer 23 further reduces the feature map output from the convolution layer 22 to obtain a new feature map. The output layer 24 is the last layer of the CNN, and outputs an identification result (information about the category) of the object with the certainty factor from the value of the node U of the previous layer, the weight of the edge, and the response function of the output layer 24. Such an output layer 24 includes, for example, a fully connected layer that connects outputs from all the nodes U of the previous layer, performs predetermined calculation, and outputs an identification result. Note that the number of fully connected layers may be two or more.

As a learning algorithm of the CNN, for example, it is possible to use a back propagation method in which image data with a correct answer is used, and a weight of each layer (edge) is sequentially changed from the output layer 24 side toward the input layer 21 side using the steepest descent method so that a square error between an output value from the output layer 24 obtained when the image data is input and a value indicating the correct answer is minimized Such CNN machine learning is performed under the control of the learning control unit 10*b*.

[3. Inference Method]

Figure 4:
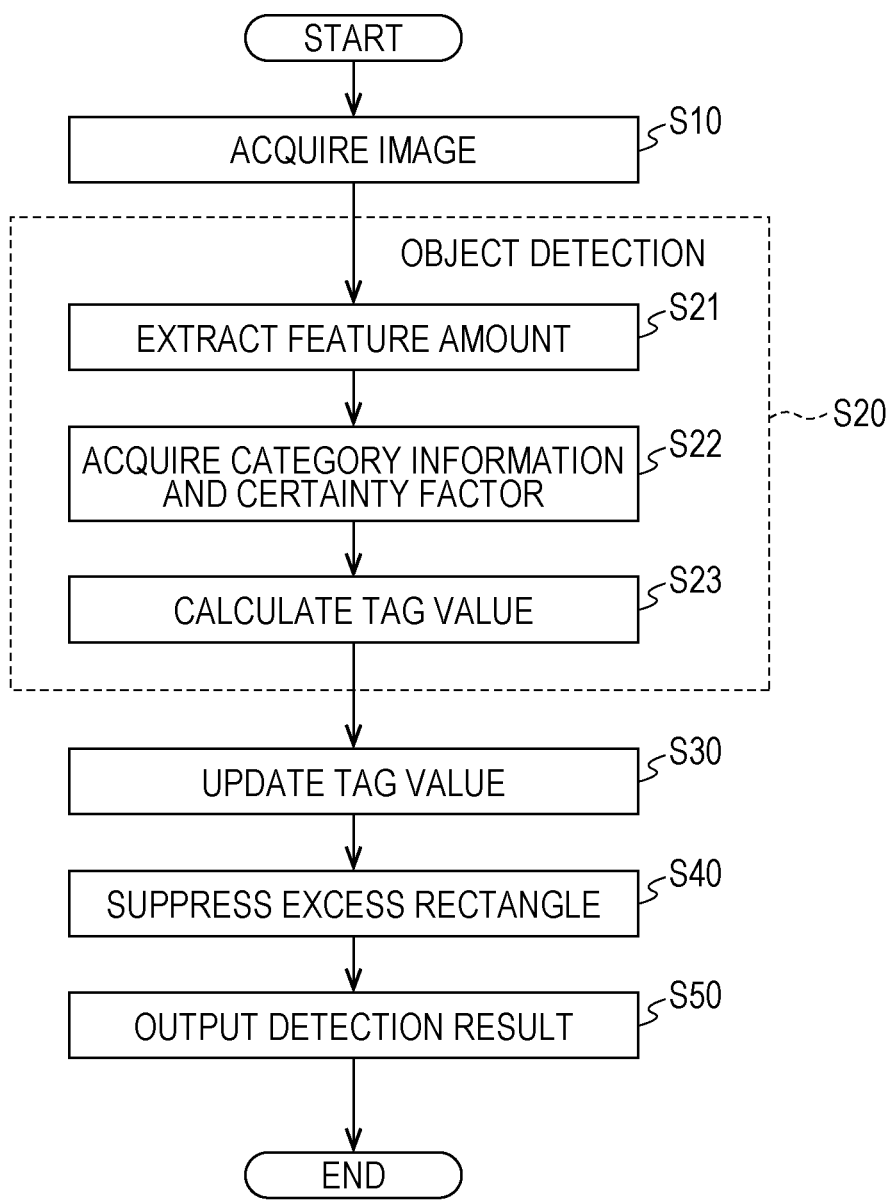
FIG. 4 is a flowchart illustrating a flow of processing of an object detection method performed by the object detection device.

Next, an object detection method (object inference method) performed by the object detection device 1 having the above configuration will be described. FIG. 4 is a flowchart illustrating a flow of processing of the object detection method. The object detection method according to the present embodiment includes an image acquisition step (S10), an object detection step (S20), a tag update step (S30), an excess rectangle suppression step (S40), and a detection result output step (S50). Each step will be described below.

(S10; Image Acquisition Step)

In S10, the object detection device 1 acquires an image (image data) input from the outside. Here, an image acquired by the camera CA (see FIG. 1) is used as the image. Note that the image acquired by the object detection device 1 may be an image stored in advance in an external terminal device (for example, a personal computer) or a server and output from the terminal device or the like to the object detection device 1, an image attached to an e-mail and transmitted to the object detection device 1, or an image read from the recording medium R.

(S20; Object Detection Step)

In the object detection step of S20, the object detection unit 2 detects the object from the image including the object by neural computation using the CNN. The object detection step further includes a feature amount extraction step (S21), an information acquisition step (S22), and an object tag calculation step (S23). Note that the CNN constituting the object detection unit 2 is machine-trained in advance, and thus, can perform the processes of steps S21 to S23.

In S21, the feature amount extraction unit 2*a* extracts the feature amount (shape or the like) of the object included in the image from the image acquired in S10 by neural computation. In S22, the information acquisition unit 2*b* obtains a plurality of object rectangles indicating candidates for the position of the object by neural computation on the basis of the feature amount, and obtains the information and the certainty factor of the category of the object for each object rectangle.

Figure 5:
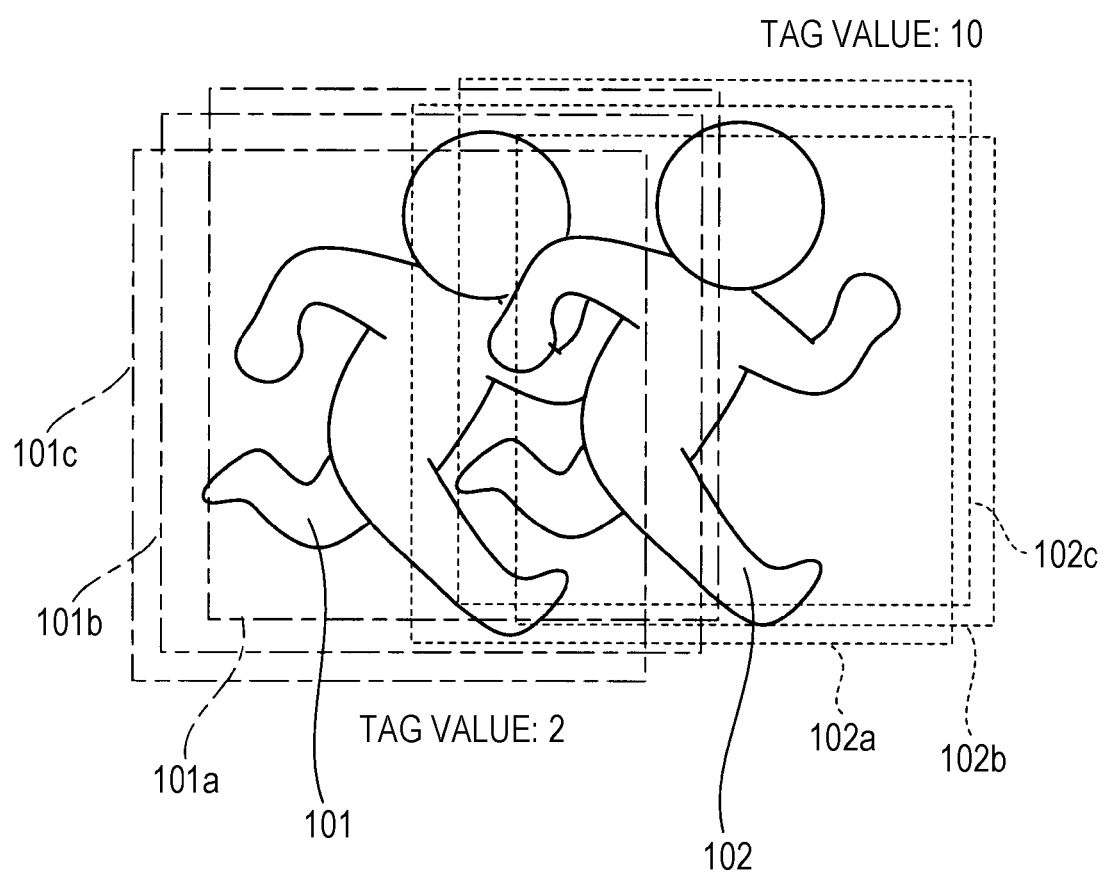
FIG. 5 is an explanatory diagram illustrating an example of object rectangles for a plurality of objects included in an input image.

For example, FIG. 5 illustrates an example of object rectangles 101*a* to 101*c* and 102*a* to 102*c* acquired by the information acquisition unit 2*b* for the objects 101 and 102 included in the input image. Here, it is assumed that the categories of the object 101 for the respective object rectangles 101*a* to 101*c* acquired by the information acquisition unit 2*b* are all "person", and the certainty factors of the categories of the object 101, that is, degrees of certainty that the object 101 is a "person", for the object rectangles 101*a* to 101*c* are, for example, 0.8, 0.9, and 0.4, respectively. In addition, it is assumed here that the categories of the object 102 for the respective object rectangles 102*a* to 102*c* acquired by the information acquisition unit 2*b* are all "person", and the certainty factors of the categories of the object 102 for the respective object rectangles 102*a* to 102*c* are, for example, 0.9, 0.7, and 0.5.

In S23, the object tag calculation unit 2*c* calculates, for each object rectangle, an object tag indicating which object in the image the object rectangle is linked to, on the basis of the feature amount extracted in S21. For example, since the object rectangles 101*a* to 101*c* are linked to the object 101, the object tag calculation unit 2*c* calculates, for example, "2" as the tag values of the object tags of the object rectangles 101*a* to 101*c*. On the other hand, since the object rectangles 102*a* to 102*c* are linked to the object 102, the object tag calculation unit 2*c* calculates, for example, "10" as the tag values of the object tags of the object rectangles 102*a* to 102*c*.

Note that, in FIG. 5, all the tag values of the object rectangles 101*a* to 101*c* are set to "2", and all the tag values of the object rectangles 102*a* to 102*c* are set to "10". However, the tag values of the object rectangles 101*a* to 101*c* may vary around the tag value "2", such as "1.9", "2", and "2.2", and the tag values of the object rectangles 102*a* to 102*c* may vary around the tag value "10", such as "9.5", "10", and "10.3". The degree of variation of the tag values varies depending on the degree of machine learning of the object detection unit 2.

(S30; Tag Update Step)

In S30, when the tag values calculated in S23 vary among a plurality of object rectangles linked to the same object, the tag updating unit 3 changes (updates) the tag values to the same tag value. When the tag values calculated in S23 are the same among the plurality of object rectangles linked to the same object, the process of S30 can be skipped. Here, the following description will be given on the assumption that the tag values for the same object calculated in S23 vary.

As a method for updating the tag value, there are (1) a method using grouping by threshold processing and (2) a method using grouping by a k-means method+an elbow method.

(1) Method Using Grouping by Threshold Processing

Figure 6:
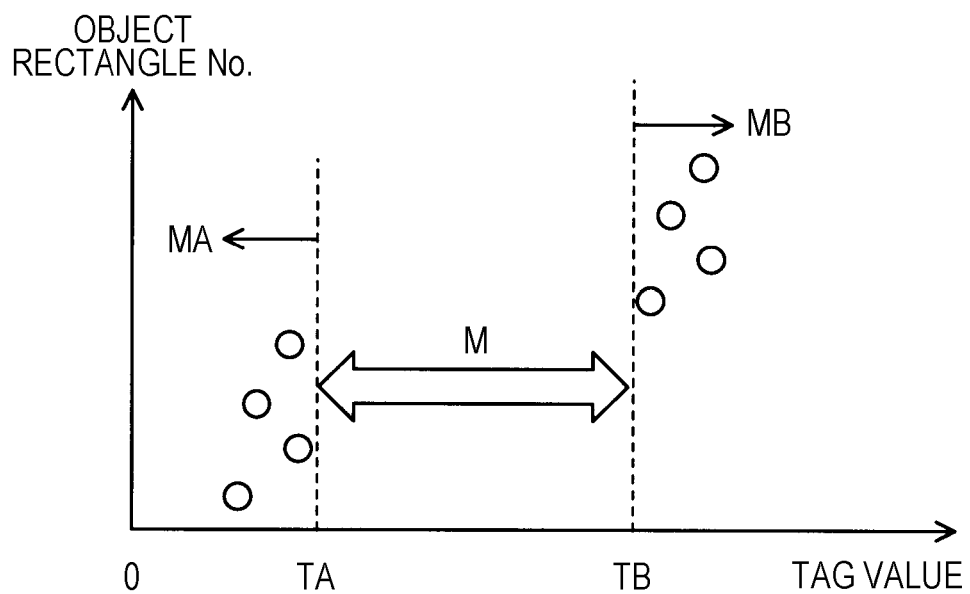
FIG. 6 is an explanatory diagram illustrating an example of a method for grouping and updating a tag value.
Figure 6:
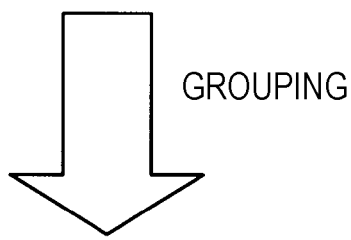
Figure 6:
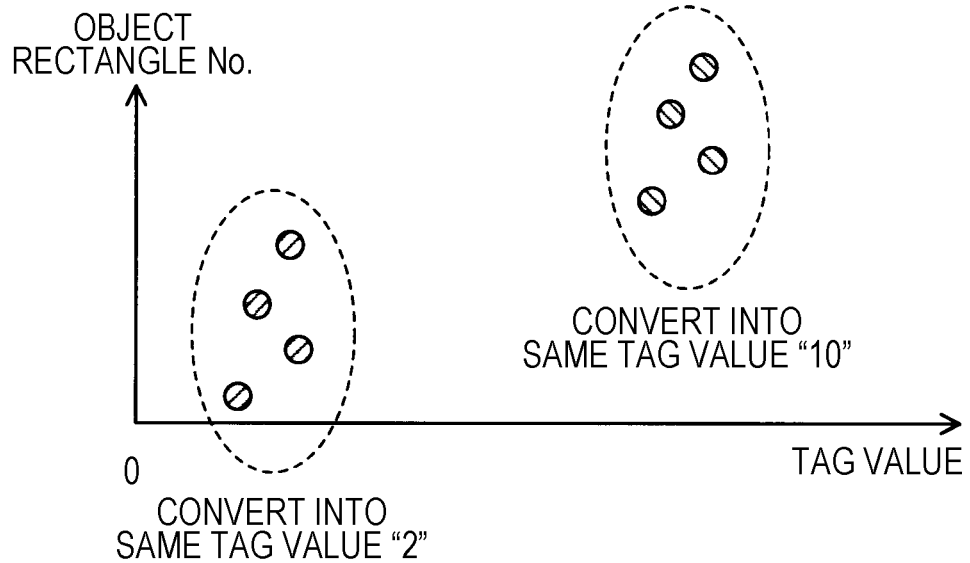

FIG. 6 schematically illustrates a method for updating a tag value using grouping by threshold processing. In a case where the tag value calculated for each object rectangle by the object tag calculation unit 2*c* does not present between a first threshold TA and a second threshold TB and is distributed to a first tag region MA less than the first threshold TA and a second tag region MB larger than the second threshold, and the first tag region MA and the second tag region TB are separated from each other by a predetermined margin M or more (TB−TA≥M), the tag updating unit 3 groups the tag values in each of the tag regions, and converts the tag values into the same tag value in the same tag region and different tag values between different tag regions. In the example of FIG. 6, the tag updating unit 3 converts the tag values in the first tag region MA into the same tag value "2", and converts the tag values in the second tag region MB into the same tag value "10".

For example, when tag values of a plurality of object rectangles vary between "2" and "2.2", there may be a question whether the individual object rectangles are linked to the same object or different objects. However, when the plurality of object rectangles are divided into each group and the tag values are unified for each group as described above, the above question does not arise. That is, for example, all object rectangles unified with the tag value of "2" can be linked to the same object 101, and all object rectangles unified with a value (for example, "10") different from the tag value of "2" can be linked to an object different from the object 101 (for example, the object 102). Thus, it is clear which object each object rectangle is linked to.

(2) Method Using Grouping by k-Means Method+Elbow Method

Figure 7:
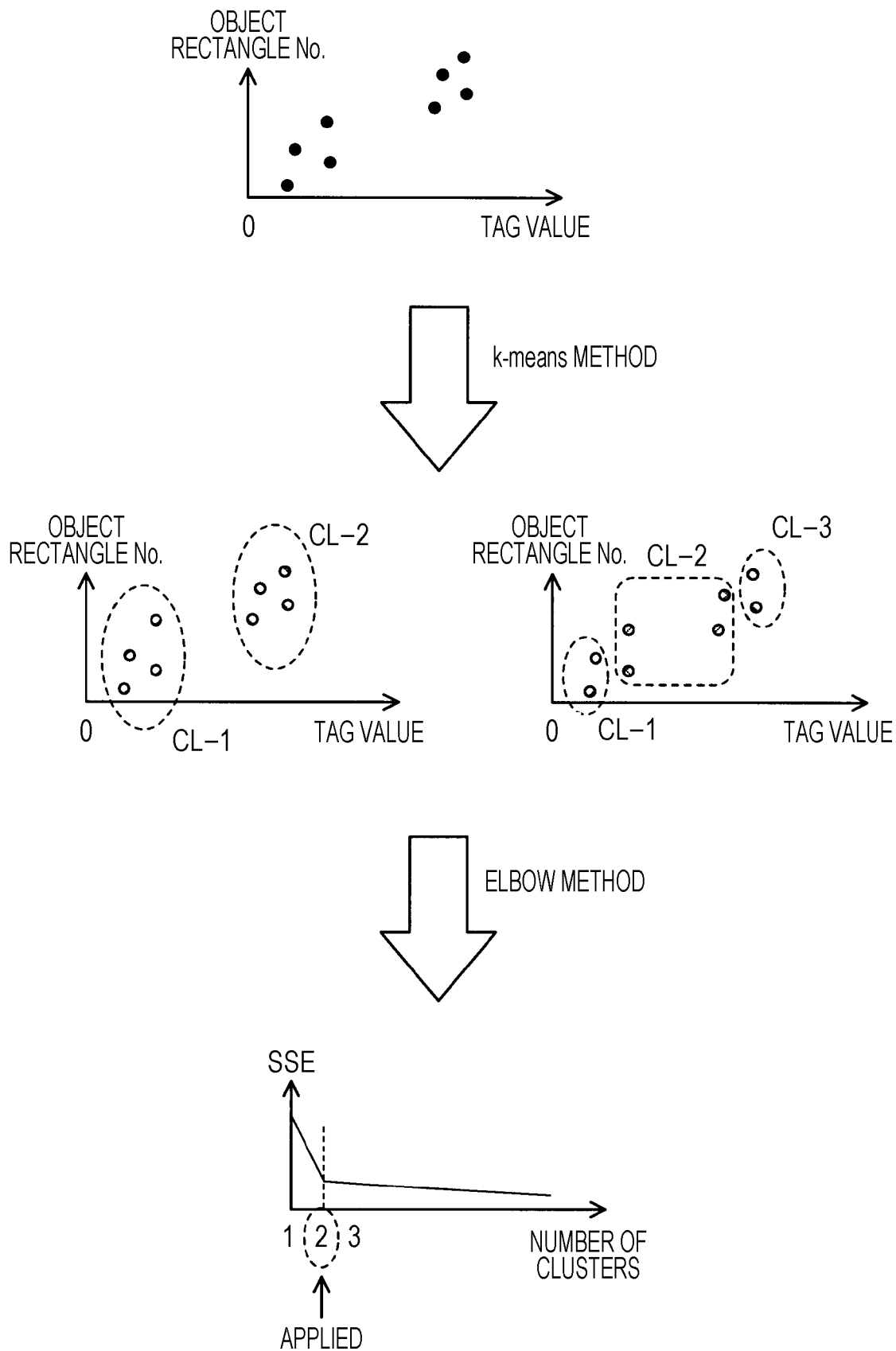
FIG. 7 is an explanatory diagram illustrating another example of the method for grouping and updating a tag value.

FIG. 7 schematically illustrates a method for updating a tag value using grouping by k-means method+elbow method. First, the tag updating unit 3 generates a plurality of clusters by changing the number of clusters (k value) in a given range by the k-means method with respect to the tag value calculated for each object rectangle. FIG. 7 illustrates a case where the tag updating unit 3 generates two clusters CL-1 and CL-2 by the k-means method and a case where the tag updating unit 3 generates three clusters CL-1 to CL-3 by the k-means method.

Thereafter, the tag updating unit 3 calculates the optimum number of clusters by the elbow method for each cluster generated above. Here, as illustrated in FIG. 7, the elbow method is a method in which the sum of squared errors (SSE) for each cluster is plotted and the number of clusters in a portion where a graph indicating a change in SSE is bent like an "elbow" is regarded as the optimum number of clusters. In the example of FIG. 7, the number of clusters "2" is calculated as the optimum number of clusters.

Then, the tag updating unit 3 groups the tag values of each of the calculated number of clusters by the elbow method, and converts the tag values into the same tag value in the same cluster and different tag values between different clusters. That is, the tag updating unit 3 converts the tag values in the cluster CL-1 into the same tag value (for example, a tag value "2"), and converts the tag values in the cluster CL-2 into the same tag value (for example, a tag value "10").

As described above, by obtaining the optimum number of clusters using the k-means method and the elbow method and unifying the tag values for each cluster, no question arises as to whether individual object rectangles are linked to the same object or different objects, so that it becomes clear which object each object rectangle is linked to by the unified tag value, as in (1) described above.

In both the methods (1) and (2), an upper limit may be set for the number of groups (the number of clusters), and the optimum number of groups (the number of clusters) may be obtained within a range up to the upper limit.

(S40; Excess Rectangle Suppression Step)

In S40, the excess rectangle suppression unit 4 separates a plurality of object rectangles for which the object category is the same into a plurality of groups according to the object tags (tag values), and performs NMS processing of deleting an excess object rectangle in each of the separated groups on the basis of the certainty factor. For example, as illustrated in FIG. 5, the objects 101 and 102 are the same in category which is "person". Therefore, the excess rectangle suppression unit 4 separates the object rectangles 101a to 101c and 102a to 102c into a group (object rectangles 101a to 101c) having a tag value of "2" and a group (object rectangles 102a to 102c) having a tag value of "10", performs the NMS processing on the object rectangles 101a to 101c, and performs the NMS processing on the object rectangles 102a to 102c.

More specifically, since the certainty factors of the object rectangles 101a to 101c are 0.8, 0.9, and 0.4, respectively, as described above, the excess rectangle suppression unit 4 leaves only the object rectangle 101b having the highest certainty factor, sets, to zero, the certainty factor of the category of the object 101 indicated by the object rectangles 101a and 101c having a degree of overlap (IoU) equal to or greater than the threshold with respect to the object rectangle 101b, and deletes the object rectangles 101a and 101c. In addition, since the certainty factors of the object rectangles 102a to 102c are 0.9, 0.7, and 0.5, respectively, as described above, the excess rectangle suppression unit 4 leaves only the object rectangle 102a having the highest certainty factor, sets, to zero, the certainty factor of the category of the object 102 indicated by the object rectangles 102b and 102c having an IoU equal to or greater than the threshold with respect to the object rectangle 102a, and deletes the object rectangles 102b and 102c.

Figure 8:
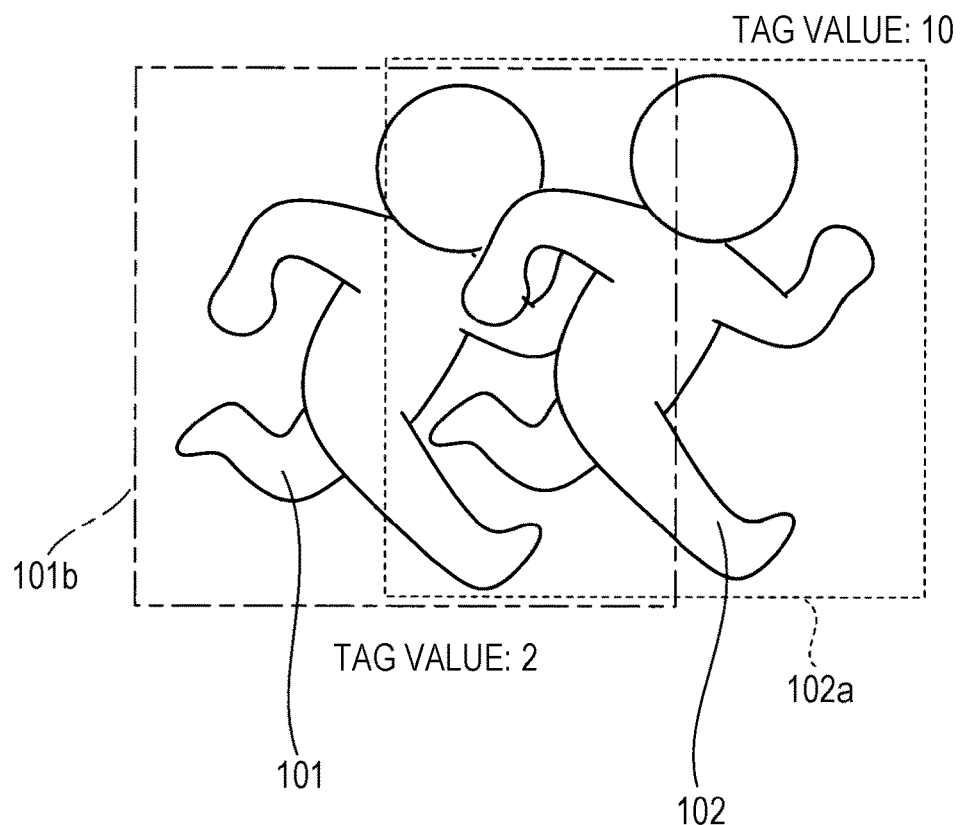
FIG. 8 is an explanatory diagram illustrating an object rectangle after NMS processing.

FIG. 8 shows the object rectangles 101b and 102a left by the NMS processing. With the above NMS processing, only one object rectangle 101b remains for the object 101, and only one object rectangle 102a remains for the object 102. Moreover, no process is performed to change the certainty factor of the category of the object 101 indicated by the object rectangle 101b and the certainty factor of the object 102 indicated by the object rectangle 102a.

(S50; Detection Result Output Step)

Figure 9:
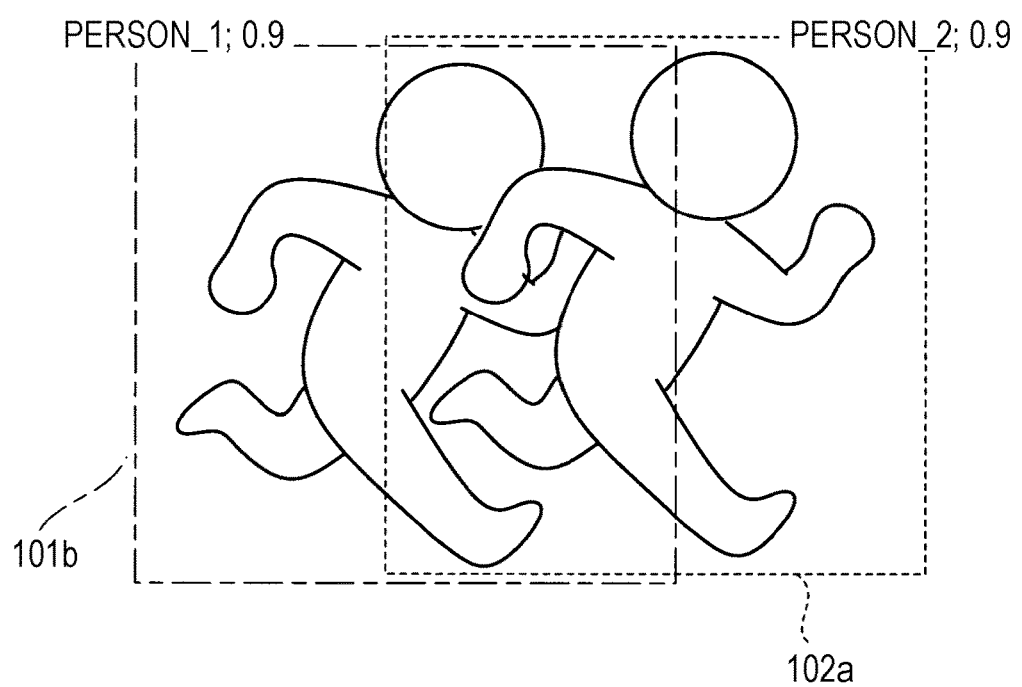
FIG. 9 is an explanatory diagram illustrating an example of a display screen displaying a detection result of an object.

In S50, the control unit 10 displays, on the display unit 7, the result after the NMS processing, that is, the information and the certainty factor of the categories of the objects 101 and 102 indicated by the object rectangles 101b and 102a. FIG. 9 illustrates an example of a display screen of the display unit 7. For example, for the object 101 in FIG. 8, "PERSON" indicating the category of "person", a number "1" for distinguishing from other persons, and a certainty factor "0.9" of the category of the object 101 indicated by the object rectangle 101b are displayed together with the object rectangle 101b. In addition, for the object 102 in FIG. 8, "PERSON" indicating the category of "person", a number "2" for distinguishing from other persons, and the certainty factor "0.9" of the category of the object 102 indicated by the object rectangle 102a are displayed together with the object rectangle 102a. Note that the control unit 10 may output the detection result to an external terminal via the communication unit 8 instead of displaying the result after the NMS processing on the display unit 7.

[4. Effects]

As described above, the object rectangles belonging to each of the groups separated by the excess rectangle suppression unit 4 are linked to the same object by the object tags. That is, in the above example, the object rectangles 101a to 101c belonging to one group are linked to the same object 101 by the tag value "2". The object rectangles 102a to 102c belonging to the other group are linked to the same object 102 by the tag value "10". Therefore, even in a case where the objects 101 and 102 to be detected in the image are close to each other, only one object rectangle is left for each of the objects 101 and 102 which are close to each other, the information and the certainty factor of the categories of the objects 101 and 102 corresponding to the object rectangles (for example, object rectangles 101b and 102a in FIG. 8) are left and can be output as illustrated in FIG. 9, due to the execution of the NMS processing for each group based on the tag values. That is, the object rectangles 101b and 102a of the objects 101 and 102 to be detected can be left as they are without lowering the certainty factors. Thus, both of the objects 101 and 102 that are close to each other can be detected with high accuracy (without being deleted by the NMS processing).

Furthermore, in S30, when the tag values calculated for respective object rectangles are distributed in a plurality of tag regions separated by a predetermined margin M or more, the tag updating unit 3 groups the tag values in each tag region, and converts the tag values into the same tag value in the same tag region and into different tag values between different tag regions. As a result, even when the tag values of the object tags linked to the same object vary, the excess rectangle suppression unit 4 can easily separate the plurality of object rectangles into the plurality of groups on the basis of the tag values updated by the tag updating unit 3, that is, the tag values unified for each tag region.

In addition, in S30, the tag updating unit 3 may generate a plurality of clusters by changing the number of clusters in any given range by the k-means method with respect to the tag values calculated for the respective object rectangles, then calculate the optimum number of clusters by the elbow method, group the tag values of each of the calculated number of clusters, and convert the tag values into the same tag value in the same cluster and into different tag values between different clusters. Even when the tag values of the object tags linked to the same object vary, the excess rectangle suppression unit 4 can easily separate the plurality of object rectangles into a plurality of groups on the basis of the tag values updated by the tag updating unit 3, that is, the tag values unified for each cluster.

In addition, the excess rectangle suppression unit 4 sets, to zero, the certainty factor of the category of the object (for example, the object 101) indicated by the object rectangle (for example, the object rectangles 101a and 101c) having an IoU equal to or greater than the threshold with respect to the object rectangle (for example, the object rectangle 101b) having the highest certainty factor among the plurality of object rectangles (for example, the object rectangles 101a to 101c) having the same object tag, whereby it is possible to reliably delete an excess (unnecessary) object rectangle from the plurality of object rectangles indicating the same object.

[5. Learning for Calculating Object Tag]

The learning control unit 10b of the control unit 10 may perform back propagation to back propagate a first error Loss #1 calculated by a first loss function for bringing the tag values of a plurality of object rectangles for the same object to be close to each other and a second error Loss #2 calculated by a second loss function for separating the tag values of a plurality of object rectangles for different objects from each other, thereby updating a weight (connection weight wi) indicating strength of connection between nodes of each layer of the CNN constituting the object detection unit 2.

Here, the first error Loss #1 and the second error Loss #2 are expressed as follows. Note that the right side of the equation for obtaining Loss #1 represents the first loss function, and the right side of the equation for obtaining Loss #2 represents the second loss function.

Loss #1={(tag value of object rectangle of interest)−(average of tag values of object rectangles for same object)}$^2$ Loss #2=exp[−{(average of tag values of object rectangles of interest)−(average of tag values of object rectangles for another object)}$^2$]

Note that whether respective object rectangles are object rectangles for the same object or object rectangles for different objects can be determined by whether each object rectangle has IoU equal to or greater than a threshold with respect to the object (ground truth, hereinafter also referred to as "GT"). However, in a case where one object rectangle has IoU equal to or greater than a threshold for a plurality of objects, this object rectangle is determined to be an object rectangle for an object having the largest IoU.

Due to machine-training the object detection unit 2 by back propagating the first error Loss #1 and the second error Loss #2 as described above, the tag values of the plurality of object rectangles for the same object are calculated to be close to the same value (for example, "2"), and the tag values of the plurality of object rectangles for different objects are calculated to be separated from each other (for example, calculated to be "2" and "12" which are separated from each other) at the time of inference (at the time of object detection) after machine learning. As a result, the excess rectangle suppression unit 4 can divide the plurality of object rectangles such that the object rectangles having the same tag value or close tag values belong to the same group and the object rectangles having greatly different tag values are separated into different groups. Therefore, it is easy to separate the plurality of object rectangles into each group.

In addition, the learning control unit 10b may further perform back propagation to back propagate a third error Loss #3 calculated by a third loss function for achieving the positional accuracy of the object rectangle higher than before learning, a fourth error Loss #4 calculated by a fourth loss function for obtaining the certainty factor of presence/absence of the object higher than before learning, and a fifth error Loss #5 calculated by a fifth loss function for obtaining the certainty factor of the category of the object higher than before learning, thereby updating the weight.

Here, the third error Loss #3, the fourth error Loss #4, and the fifth error Loss #5 are expressed as follows. Note that the right side of the equation for obtaining Loss #3 represents the third loss function, the right side of the equation for obtaining Loss #4 represents the fourth loss function, and the right side of the equation for obtaining Loss #5 represents the fifth loss function $$\text{Loss\_3} = \lambda_{coord}\sum_{i=0}^{S^2}\sum_{j=0}^{B}I_{ij}^{obj}(x_i - \hat{x}_i)^2 + (y_i - \hat{y}_i)^2 +$$

$$\lambda_{coord}\sum_{i=0}^{S^2}\sum_{i=0}^{B}I_{ij}^{obj}\left(\sqrt{\omega_i} - \sqrt{\hat{\omega}_i}\right)^2 + \left(\sqrt{h_i} - \sqrt{\hat{h}_i}\right)^2$$

[Equation 1]

where $\lambda_{coord}$ represents a weight for regression loss of object rectangle, $I_{ij}^{obj}$ is 1 when an object (GT) is present in a grid, and 0 when the object is not present, "^" represents a value of the object (GT), x and y each represent a coordinate value of object rectangle, and w and h represent the width and height of the object rectangle, respectively.

$$\text{Loss\_4} = \sum_{i=0}^{S^2}\sum_{j=0}^{B}I_{ij}^{obj}(C_i - \hat{C}_i)^2 + \lambda_{noobj}\sum_{i=0}^{S^2}\sum_{j=0}^{B}I_{ij}^{noobj}(C_i - \hat{C}_i)^2$$

[Equation 2]

where $\lambda_{noobj}$ represents a weight for a case where an object (GT) is not present in a grid, $I_{ij}^{obj}$ is 1 when the object (GT) is not present in the grid, and 0 when the object is present, and G represents the certainty factor indicating whether or not the object is present.

$$\text{Loss\_5} = \sum_{i=0}^{s^2} I_{ij}^{obj} \sum_{c \in classes=0} (P_i(c) - \hat{P}_i(c))^2 \quad \text{[Equation 3]}$$

where

P(c) represents the certainty factor of category for class c.

Since the object detection unit 2 is machine-trained in advance so as to increase the positional accuracy of the object rectangle, the certainty factor of presence/absence of the object, and the certainty factor of the category of the object, the object detection unit 2 (particularly, the information acquisition unit 2b) can accurately obtain the object rectangle and the certainty factor at the time of actual inference. As a result, the effect of the present embodiment, that is, the effect of improving the detection accuracy of objects which are close to each other can be further enhanced.

[6. Efficient Learning for Calculating Object Tag (Part 1)]

When calculating the second error Loss #2, the learning control unit 10b may change the coefficient of the second loss function according to the distance between the plurality of object rectangles for different objects, and change the second error Loss #2 according to the distance. The method for calculating the distance will be described later in detail. For example, when the coefficient of the second loss function is α, the second error Loss #2 may be calculated by changing the value of the coefficient α according to the distance. That is, the second error Loss #2 in this case is calculated by the following equation.

Loss #2=α×exp[−{(average of tag values of object rectangles of interest)−(average of tag values of object rectangles for another object)}$^2$]

Figure 10:
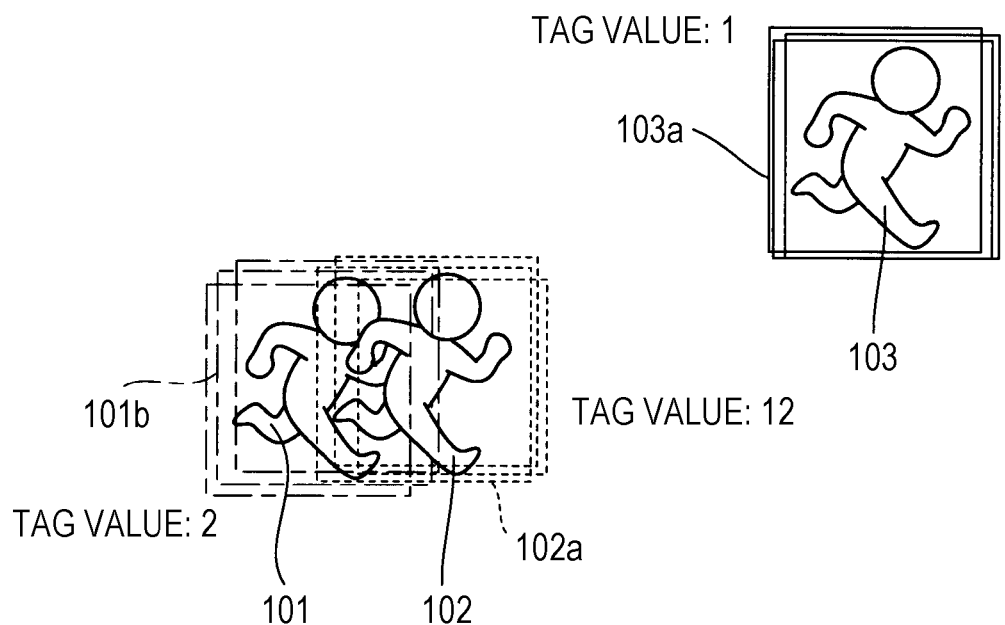
FIG. 10 is an explanatory diagram illustrating an example of tag values of any given object rectangles for a plurality of objects.

FIG. 10 shows examples of tag values for any given object rectangle 101b of the object 101 and for any given object rectangles 102a and 103a of the objects 102 and 103. Note that the categories of the objects 101 to 103 are the same (for example, person), the object 101 and the object 102 are close to each other in the image (the distance between them is short), and the object 101 and the object 103 are away from each other in the image (the distance between them is long).

When the object 101 and the object 102 are close to each other, it is necessary to separate the tag value of the object rectangle 101b and the tag value of the object rectangle 102a in order to accurately distinguish the object rectangle 101b and the object rectangle 102a. On the other hand, in a case where the object 101 and the object 103 are separated from each other, IoU between the object rectangle 101b and the object rectangle 103a is zero that is not more than the threshold, and thus, the object rectangle 101b and the object rectangle 103a are not simultaneously subjected to the NMS processing. Therefore, even if the tag values are close to each other, each of the objects 101 and 103 can be detected by separately performing NMS processing on each of the object rectangles 101b and 103a.

In view of this, at the time of learning, the learning control unit 10b increases the coefficient α of the second loss function to increase the second error Loss #2 in a case where the distance between the plurality of object rectangles for different objects is short, and decreases the coefficient α of the second loss function to decrease the second error Loss #2 in a case where the distance is long. The learning control unit 10b back propagates the second error Loss #2 which has been adjusted as described above to machine-train the object detection unit 2 in advance, so that the object detection unit 2 can calculate tag values which are separated from each other as two objects come close to each other at the time of inference. As a result, it is easy to separate the plurality of object rectangles into different groups based on the tag values, and it is possible to more accurately detect each of the objects which are close to each other by performing the NMS processing for each group.

FIG. 10 illustrates an example in which "12" sufficiently separated from "2", which is the tag value of the object rectangle 101b of the object 101, is calculated as the tag value of the object rectangle 102a of the object 102 close to the object 101, and "1" close to "2" is calculated as the tag value of the object rectangle 103a of the object 103 away from the object 101. Since the object rectangle 101b and the object rectangle 103a are sufficiently distant from each other, these object rectangles 101b and 103a can be distinguished from each other even if they have tag values close to each other. On the other hand, since the object rectangle 101b and the object rectangle 102a are close to each other but have tag values which are separated from each other, the object rectangles 101b and 102a can be accurately distinguished from each other on the basis of the tag values, to accurately detect the objects 101 and 102.

Figure 11:
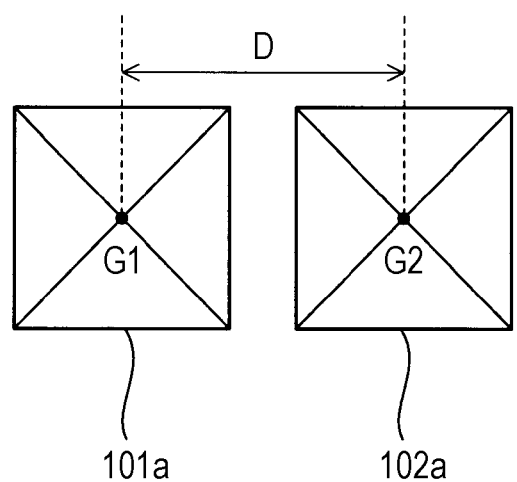
FIG. 11 is an explanatory diagram illustrating an example of a method for calculating a distance between a plurality of object rectangles for different objects.
Figure 12:
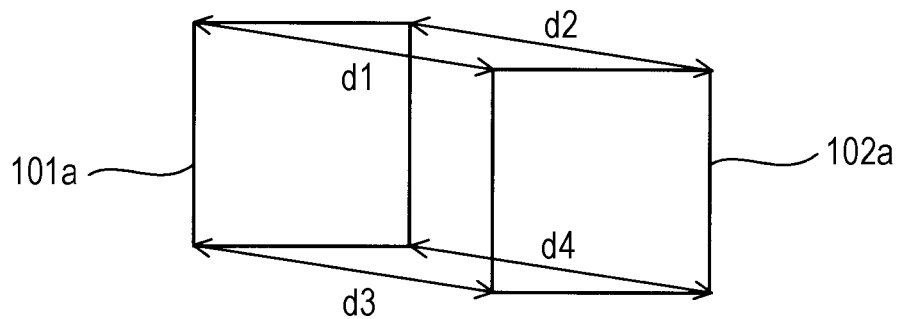
FIG. 12 is an explanatory diagram illustrating another example of the method for calculating the distance.
Figure 13:
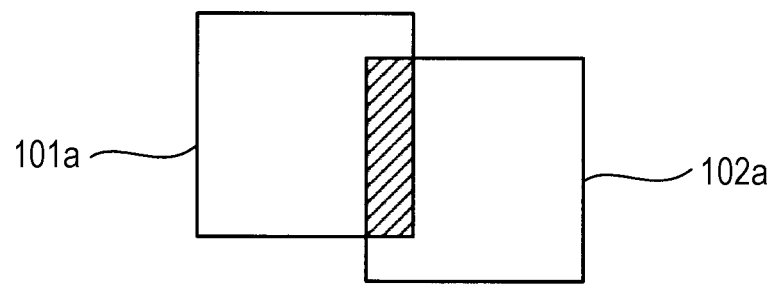
FIG. 13 is an explanatory diagram illustrating still another example of the method for calculating the distance.

Next, a method for calculating a distance between a plurality of object rectangles for different objects will be described. FIGS. 11 to 13 each illustrate an example of a method for calculating a distance D between the object rectangle 101a and the object rectangle 102a which are examples of a plurality of object rectangles for different objects. As illustrated in FIG. 11, the distance D may be a distance between the centroid G1 of the object rectangle 101a and the centroid G2 of the object rectangle 102a. Note that the x coordinate and the y coordinate of the centroid G1 are average values of the x coordinates and the y coordinates of the four vertexes of the object rectangle 101a, respectively, and the x coordinate and the y coordinate of the centroid G2 are average values of the x coordinates and the y coordinates of the four vertexes of the object rectangle 102a, respectively.

Furthermore, as illustrated in FIG. 12, the distance D may be an average of distances between corresponding vertexes between the object rectangle 101a and the object rectangle 102a. That is, when the distances between the corresponding vertexes are d1, d2, d3, and d4, respectively, the distance D may be represented by D=(d1+d2+d3+d4)/4. Furthermore, as illustrated in FIG. 13, the distance D may be IoU indicating the degree of overlap between the object rectangle 101a and the object rectangle 102a (the ratio of the area of the shaded portion to the entire area).

The distance D between the object rectangle 101a and the object rectangle 102a can be calculated by any of the above methods. Therefore, the learning control unit 10b can calculate the distance between the plurality of object rectangles for different objects by the above methods, and change the second error Loss #2 according to the distance by changing the coefficient of the second loss function.

[7. Efficient Learning for Calculating Object Tag (Part 2)]

When calculating the second error Loss #2, the learning control unit 10b may change the coefficient of the second loss function according to the categories of the objects which are adjacent to each other in the image, and change the second error Loss #2 according to the categories. For example, when the coefficient of the second loss function is β, the second error Loss #2 may be calculated by changing the value of the coefficient β according to the category. That is, the second error Loss #2 in this case is calculated by the following equation.

$$\text{Loss \#2} = \beta \times \exp[-\{(\text{average of tag values of object rectangles of interest}) - (\text{average of tag values of object rectangles for another object})\}^2]$$

Figure 14:
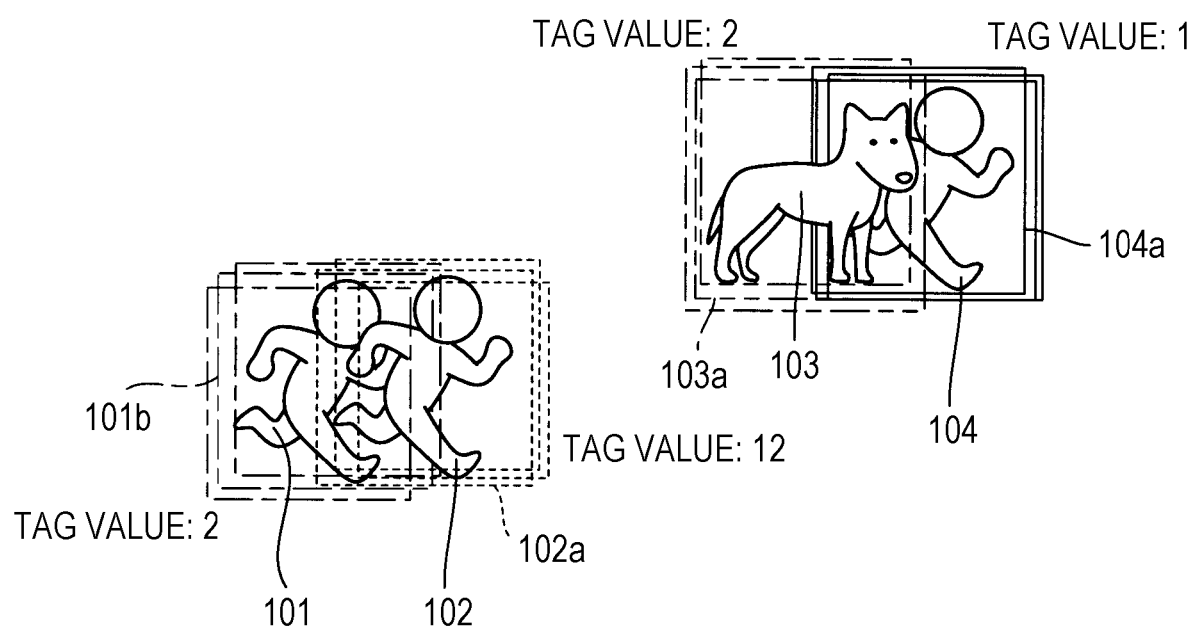
FIG. 14 is an explanatory diagram illustrating another example of tag values of any given object rectangles for a plurality of objects.
Figure 15:
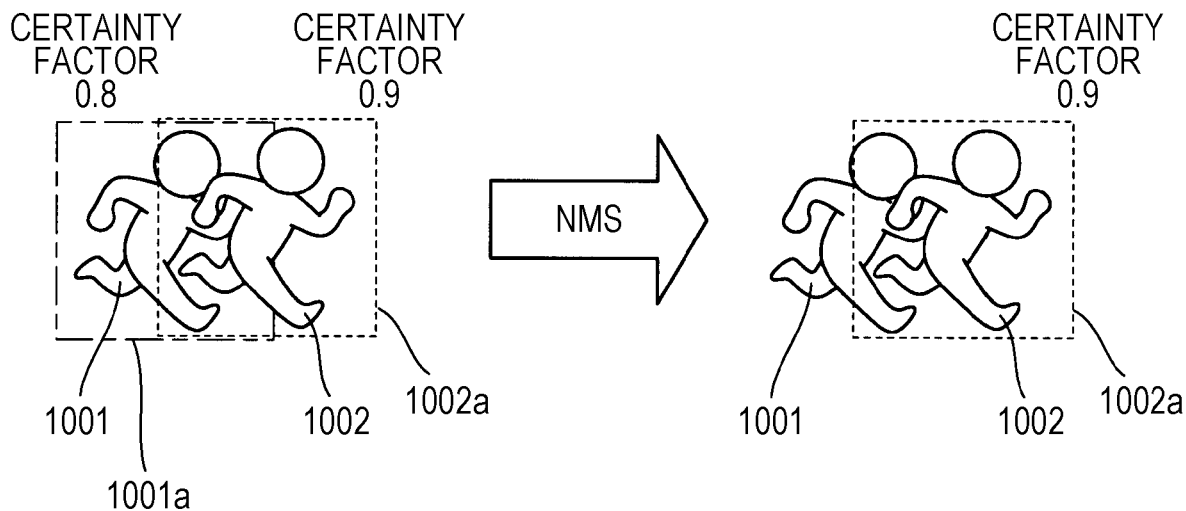
FIG. 15 is an explanatory diagram schematically illustrating conventional NMS processing.
Figure 16:
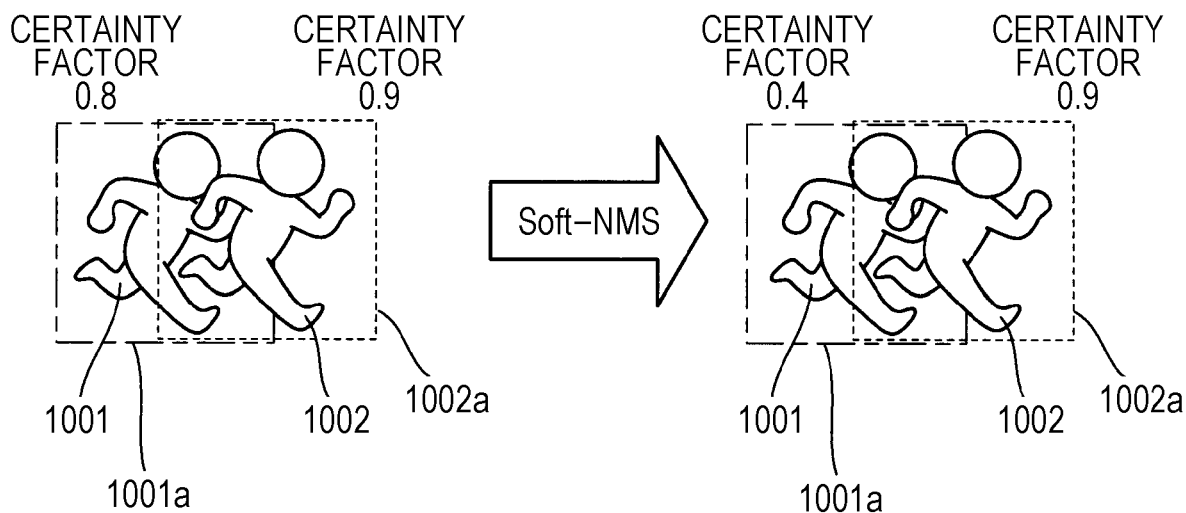
FIG. 16 is an explanatory diagram schematically illustrating another conventional NMS processing.
Figure 17:
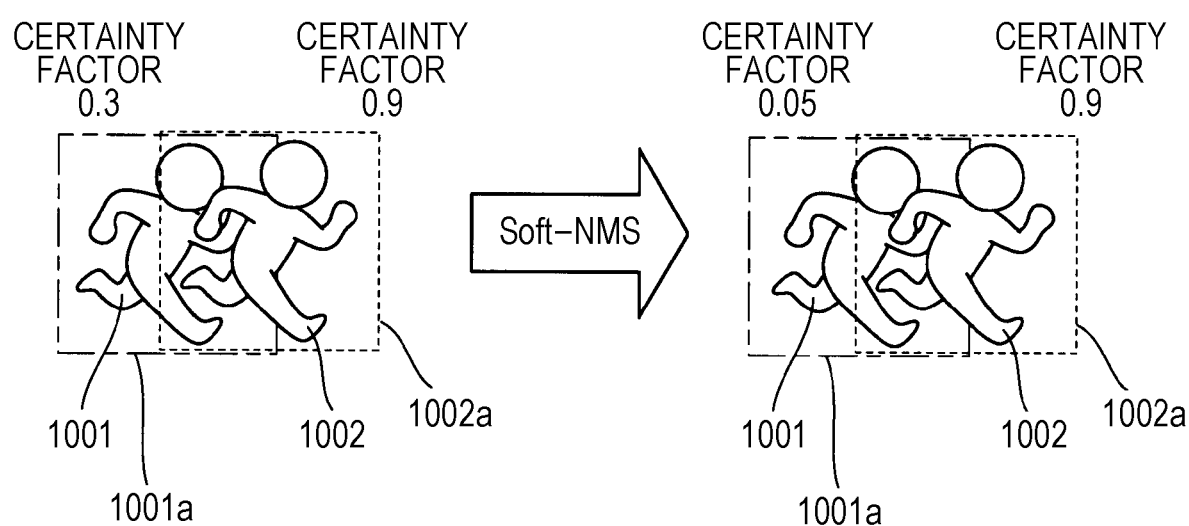
FIG. 17 is an explanatory diagram illustrating an inconvenience caused by the other NMS processing.

FIG. 14 shows an example of tag values of any given object rectangles 101b, 102a, 103a, and 104a of the objects 101 to 104. Note that the categories of the objects 101, 102, and 104 are the same (for example, person), and the category of the object 103 is "dog" which is different from the categories of the objects 101, 102, and 104. In addition, the object 101 and the object 102 are close to each other, and the object 103 and the object 104 are close to each other.

When the object 101 and the object 102 which are the same in category are close to each other, it is necessary to separate the tag value of the object rectangle 101b and the tag value of the object rectangle 102a in order to accurately distinguish the object rectangle 101b and the object rectangle 102a. On the other hand, even if the object 103 and the object 104 are close to each other, they are detected to be in different categories, and thus, the object rectangle 103a and the object rectangle 104a are not simultaneously subjected to the NMS processing (this is because the NMS processing is performed on the object rectangles same in category). Therefore, even if the tag values of the object rectangle 103a and the object rectangle 104a are close to each other, they will be separately subjected to NMS processing, so that the object 103 and the object 104 can be detected separately.

In view of this, at the time of learning, the learning control unit 10b increases the coefficient β of the second loss function to increase the second error Loss #2 in a case where the categories of the objects which are adjacent to each other are the same, and decreases the coefficient β of the second loss function to decrease the second error Loss #2 in a case where the categories are different. The learning control unit 10b back propagates the second error Loss #2 which has been adjusted as described above to machine-train the object detection unit 2 in advance, so that the object detection unit 2 can calculate, at the time of inference, tag values which are separated from each other, when the objects that are the same in category are close to each other. FIG. 14 illustrates an example in which "12" sufficiently separated from "2", which is the tag value of the object rectangle 101b of the object 101, is calculated as the tag value of the object rectangle 102a of the object 102 which is close to the object 101 and which is the same in category as the object 101. This makes it easy to separate the plurality of object rectangles into different groups on the basis of the tag values "2" and "12". Therefore, it is possible to more accurately detect each of adjacent objects that are the same in category by performing the NMS processing for each group.

On the other hand, the object rectangle 103a and the object rectangle 104a are close to each other, but the object 103 and the object 104 are different from each other in category. Therefore, the object detection unit 2 calculates, for example, "1" close to "2", which is the tag value of the object rectangle 103a, as the tag value of the object rectangle 104a. Since the categories of the objects 103 and 104 are different, the object rectangle 103a and the object rectangle 104a are not simultaneously subjected to the NMS processing even if the tag values are close to each other as described above. Therefore, it is possible to separately detect the objects 103 and 104 which are different from each other in category, despite their tag values being close to each other.

[8. Program and Recording Medium]

The object detection device 1 (particularly, the object detection unit 2) described in the present embodiment can be constructed by, for example, a computer (PC) installed with a predetermined program (application software). When the computer (for example, the control unit 10 of the PC) reads and executes the above program, the computer can execute each processing (each step) of the above object detection method. That is, the object detection method according to the present embodiment can be implemented by machine-training the object detection unit 2 of the object detection device 1. Such a program is acquired by being downloaded from the outside via, for example, a network and stored in the storage unit 5. In addition, the program may be recorded on the computer-readable recording medium R (see FIG. 1) such as a compact disk-read only memory (CD-ROM), and the computer may read the program from the recording medium R and store the program in the storage unit 5.

[9. Others]

The object detection device, the object detection method, the program, and the recording medium according to the present embodiment described above can be expressed as follows.

1. An object detection device including an object detection unit that detects an object from an image including the object by neural computation using a convolutional neural network, wherein the object detection unit includes:

a feature amount extraction unit that extracts a feature amount of the object from the image;

an information acquisition unit that obtains a plurality of object rectangles indicating candidates for a position of the object on the basis of the feature amount and obtains information and a certainty factor of a category of the object for each of the object rectangles; and an object tag calculation unit that calculates, for each of the object rectangles, an object tag indicating which object in the image the object rectangle is linked to, on the basis of the feature amount, and the object detection device further includes an excess rectangle suppression unit that separates the plurality of object rectangles for which the category of the object is the same into a plurality of groups according to the object tags, and deletes an excess object rectangle in each of the separated groups on the basis of the certainty factor.

2. The object detection device according to 1, further including a tag updating unit that updates a tag value of the object tag calculated by the object tag calculation unit, wherein when the tag values calculated for the respective object rectangles are distributed in a plurality of tag regions separated from each other by a predetermined margin or more, the tag updating unit groups the tag values in each of the tag regions, and converts the tag values into a same tag value in the same tag region and into different tag values between different tag regions.

3. The object detection device according to 1, further including a tag updating unit that updates a tag value of the object tag calculated by the object tag calculation unit, wherein the tag updating unit generates a plurality of clusters by changing the number of clusters in a given range by a k-means method with respect to the tag values calculated for the respective object rectangles, then calculates an optimum number of clusters by an elbow method, groups the tag values in each of the calculated number of clusters, and converts the tag values into a same tag value in the same cluster and into different tag values between different clusters.

4. The object detection device according to any one of 1 to 3, wherein the excess rectangle suppression unit sets, to zero, a certainty factor of a category of an object indicated by an object rectangle having a degree of overlap equal to or greater than a threshold with respect to an object rectangle having the highest certainty factor among the plurality of object rectangles having the same object tag.

5. The object detection device according to any one of 1 to 4, further including a learning control unit to machine-train the object detection unit in advance, wherein the learning control unit updates a weight indicating strength of connection between nodes of layers of the convolutional neural network constituting the object detection unit by back propagating, using back propagation, a first error calculated by a first loss function for bringing tag values of a plurality of object rectangles for a same object close to each other and a second error calculated by a second loss function for separating tag values of a plurality of object rectangles for different objects from each other.

6. The object detection device according to 5, wherein the learning control unit updates the weight by further back propagating, using back propagation, a third error calculated by a third loss function for achieving positional accuracy of the object rectangle higher than before learning, a fourth error calculated by a fourth loss function for obtaining a certainty factor of presence/absence of the object higher than before learning, and a fifth error calculated by a fifth loss function for obtaining a certainty factor of the category of the object higher than before learning.

7. The object detection device according to 5 or 6, wherein the learning control unit changes a coefficient of the second loss function according to a distance between a plurality of object rectangles for different objects, and changes the second error according to the distance.

8. The object detection device according to 7, wherein the distance between the plurality of object rectangles for the different objects is a distance between centroids of the object rectangles.

9. The object detection device according to 7, wherein the distance between the plurality of object rectangles for the different objects is an average of distances between corresponding vertexes between the object rectangles.

10. The object detection device according to 7, wherein the distance between the plurality of object rectangles for the different objects is a degree of overlap between the object rectangles.

11. The object detection device according to 5 or 6, wherein the learning control unit changes a coefficient of the second loss function according to categories of objects adjacent to each other, and changes the second error according to the categories.

12. An object detection method including an object detection step for detecting an object from an image including the object by neural computation using a convolutional neural network, wherein the object detection step includes:

a feature amount extraction step for extracting a feature amount of the object from the image;

an information acquisition step for obtaining a plurality of object rectangles indicating candidates for a position of the object on the basis of the feature amount and obtains information and a certainty factor of a category of the object for each of the object rectangles; and an object tag calculation step for calculating, for each of the object rectangles, an object tag indicating which object in the image the object rectangle is linked to, on the basis of the feature amount, and the object detection method further includes an excess rectangle suppression step for separating the plurality of object rectangles for which the category of the object is the same into a plurality of groups according to the object tags, and deleting an excess object rectangle in each of the separated groups on the basis of the certainty factor.

13. The object detection method according to 12, further including a tag update step for updating a tag value of the object tag calculated by the object tag calculation step, wherein the tag update step includes, when the tag values calculated for the respective object rectangles are distributed in a plurality of tag regions separated from each other by a predetermined margin or more, grouping the tag values in each of the tag regions, and converting the tag values into a same tag value in the same tag region and into different tag values between different tag regions.

14. The object detection method according to 12, further including a tag update step for updating a tag value of the object tag calculated by the object tag calculation step, wherein the tag update step includes: generating a plurality of clusters by changing the number of clusters in a given range by a k-means method with respect to the tag values calculated for the respective object rectangles; then calculating an optimum number of clusters by an elbow method; grouping the tag values in each of the calculated number of clusters; and converting the tag values into a same tag value in the same cluster and into different tag values between different clusters.

15. The object detection method according to any one of 12 to 14, wherein the excess rectangle suppression step includes setting, to zero, a certainty factor of a category of an object indicated by an object rectangle having a degree of overlap equal to or greater than a threshold with respect to an object rectangle having the highest certainty factor among the plurality of object rectangles having the same object tag.

16. The object detection method according to any one of 12 to 15, further including a learning step for machine-training the convolution neural network in advance, wherein the learning step includes updating a weight indicating strength of connection between nodes of layers of the convolutional neural network by back propagating, using back propagation, a first error calculated by a first loss function for bringing tag values of a plurality of object rectangles for a same object close to each other and a second error calculated by a second loss function for separating tag values of a plurality of object rectangles for different objects from each other.

17. The object detection method according to 16, wherein the learning step includes updating the weight by further back propagating, using back propagation, a third error calculated by a third loss function for achieving positional accuracy of the object rectangle higher than before learning, a fourth error calculated by a fourth loss function for obtaining a certainty factor of presence/absence of the object higher than before learning, and a fifth error calculated by a fifth loss function for obtaining a certainty factor of the category of the object higher than before learning.

18. The object detection method according to 16 or 17, wherein the learning step includes changing a coefficient of the second loss function according to a distance between a plurality of object rectangles for different objects so as to change the second error according to the distance.

19. The object detection method according to 16 or 17, wherein the learning step includes changing a coefficient of the second loss function according to categories of objects adjacent to each other so as to change the second error according to the categories.

20. A program for causing a computer to execute the object detection method according to any one of 12 to 19.

21. A computer-readable recording medium on which the program according to 20 is recorded.

While the embodiment of the present invention has been described above, the scope of the present invention is not limited thereto, and can be expanded or modified without departing from the gist of the invention.

INDUSTRIAL APPLICABILITY

The present invention is applicable to an apparatus or a system that detects an object from an image by using a CNN.

REFERENCE SIGNS LIST

1 Object detection device
2 Object detection unit
2a Feature amount extraction unit
2b Information acquisition unit
2c Object tag calculation unit
3 Tag updating unit
4 Excess rectangle suppression unit
10b Learning control unit

The invention claimed is:

1. An object detection device comprising a hardware processor that detects an object from an image including the object by neural computation using a convolutional neural network, wherein
the hardware processor:
extracts a feature amount of the object from the image;
obtains a plurality of object rectangles indicating candidates for a position of the object on the basis of the feature amount and obtains information and a certainty factor of a category of the object for each of the object rectangles; and
calculates, for each of the object rectangles, an object tag indicating which object in the image the object rectangle is linked to, on the basis of the feature amount,
the hardware processor further separates the plurality of object rectangles for which the category of the object is the same into a plurality of groups according to the object tags, and deletes an excess object rectangle in each of the separated groups on the basis of the certainty factor,
wherein the hardware processor updates a calculated tag value of the object tag by either one of a first method or a second method,
in the first method, when the tag values calculated for the respective object rectangles are distributed in a plurality of tag regions separated from each other by a predetermined margin or more, the hardware processor groups the tag values in each of the tag regions, and converts the tag values into a same tag value in the same tag region and into different tag values between different tag regions, and
in the second method, the hardware processor generates a plurality of clusters by changing the number of clusters in a given range by a k-means method with respect to the tag values calculated for the respective object rectangles, then calculates an optimum number of clusters by an elbow method, groups the tag values in each of the calculated number of clusters, and converts the tag values into a same tag value in the same cluster and into different tag values between different clusters.

2. The object detection device according to claim 1, wherein the hardware processor sets, to zero, a certainty factor of a category of an object indicated by an object rectangle having a degree of overlap equal to or greater than a threshold with respect to an object rectangle having the highest certainty factor among the plurality of object rectangles having the same object tag.

3. The object detection device according to claim 1, wherein
the hardware processor machine-trains in advance, and
the hardware processor updates a weight indicating strength of connection between nodes of layers of the convolutional neural network constituting the hardware processor by back propagating, using back propagation, a first error calculated by a first loss function for bringing tag values of a plurality of object rectangles for a same object close to each other and a second error calculated by a second loss function for separating tag values of a plurality of object rectangles for different objects from each other.

4. The object detection device according to claim 3, wherein the hardware processor updates the weight by further back propagating, using back propagation, a third error calculated by a third loss function for achieving positional accuracy of the object rectangle higher than before learning, a fourth error calculated by a fourth loss function for obtaining a certainty factor of presence/absence of the object higher than before learning, and a fifth error calculated by a fifth loss function for obtaining a certainty factor of the category of the object higher than before learning.

5. The object detection device according to claim 3, wherein the hardware processor changes a coefficient of the second loss function according to a distance between a plurality of object rectangles for different objects, and changes the second error according to the distance.

6. The object detection device according to claim 5, wherein the distance between the plurality of object rectangles for the different objects is a distance between centroids of the object rectangles.

7. The object detection device according to claim 5, wherein the distance between the plurality of object rectangles for the different objects is an average of distances between corresponding vertexes between the object rectangles.

8. The object detection device according to claim 5, wherein the distance between the plurality of object rectangles for the different objects is a degree of overlap between the object rectangles.

9. The object detection device according to claim 3, wherein the hardware processor changes a coefficient of the second loss function according to categories of objects adjacent to each other, and changes the second error according to the categories.

10. An object detection method comprising
    detecting an object from an image including the object by neural computation using a convolutional neural network, wherein
    the detecting includes:
        extracting a feature amount of the object from the image;
        obtaining a plurality of object rectangles indicating candidates for a position of the object on the basis of the feature amount and obtains information and a certainty factor of a category of the object for each of the object rectangles; and
        calculating, for each of the object rectangles, an object tag indicating which object in the image the object rectangle is linked to, on the basis of the feature amount, and the object detection method further comprises:
        updating, by either one of a first method or a second method, a tag value of the object tag calculated by the calculating; and
        separating the plurality of object rectangles for which the category of the object is the same into a plurality of groups according to the object tags, and deleting an excess object rectangle in each of the separated groups on the basis of the certainty factor,
    in the first method, when the tag values calculated for the respective object rectangles are distributed in a plurality of tag regions separated from each other by a predetermined margin or more, the tag values in each of the tag regions are grouped, and the tag values are converted into a same tag value in the same tag region and into different tag values between different tag regions, and
    in the second method, a plurality of clusters are generated by changing the number of clusters in a given range by a k-means method with respect to the tag values calculated for the respective object rectangles; then an optimum number of clusters is calculated by an elbow method; the tag values in each of the calculated number of clusters are grouped; and the tag values are converted into a same tag value in the same cluster and into different tag values between different clusters.

11. The object detection method according to claim 10, wherein the separating includes setting, to zero, a certainty factor of a category of an object indicated by an object rectangle having a degree of overlap equal to or greater than a threshold with respect to an object rectangle having the highest certainty factor among the plurality of object rectangles having the same object tag.

12. The object detection method according to claim 10, further comprising
    machine-training the convolution neural network in advance, wherein
    the machine-training includes updating a weight indicating strength of connection between nodes of layers of the convolutional neural network by back propagating, using back propagation, a first error calculated by a first loss function for bringing tag values of a plurality of object rectangles for a same object close to each other and a second error calculated by a second loss function for separating tag values of a plurality of object rectangles for different objects from each other.

13. The object detection method according to claim 12, wherein the machine-training includes updating the weight by further back propagating, using back propagation, a third error calculated by a third loss function for achieving positional accuracy of the object rectangle higher than before learning, a fourth error calculated by a fourth loss function for obtaining a certainty factor of presence/absence of the object higher than before learning, and a fifth error calculated by a fifth loss function for obtaining a certainty factor of the category of the object higher than before learning.

14. The object detection method according to claim 12, wherein the machine-training includes changing a coefficient of the second loss function according to a distance between a plurality of object rectangles for different objects so as to change the second error according to the distance.

15. The object detection method according to claim 12, wherein the machine-training includes changing a coefficient of the second loss function according to categories of objects adjacent to each other so as to change the second error according to the categories.

16. A non-transitory recording medium storing a computer readable program for causing a computer to execute the object detection method according to claim 10.

* * * * *